United States Patent [19]
Raes

[11] Patent Number: 5,625,886
[45] Date of Patent: Apr. 29, 1997

[54] METHOD FOR FORMING GROUPS OF COMMUNICATION TERMINALS AND USE OF SAME

[75] Inventor: Serge C. C. Raes, Lodelinsart, Belgium

[73] Assignee: Alcatel N.V., Rijswijk, Netherlands

[21] Appl. No.: 408,628

[22] Filed: Mar. 22, 1995

[30] Foreign Application Priority Data

Mar. 22, 1994 [EP] European Pat. Off. ............. 94200739

[51] Int. Cl.$^6$ ...................................................... H04B 7/26
[52] U.S. Cl. ........................................ 455/54.1; 455/34.1
[58] Field of Search ........................... 455/17, 11.1, 34.1, 455/34.2, 53.1, 54.1, 54.2, 56.1; 379/63

[56] References Cited

U.S. PATENT DOCUMENTS

| | | | |
|---|---|---|---|
| 4,939,746 | 7/1990 | Childress | 455/33 |
| 5,014,345 | 5/1991 | Comroe et al. | |
| 5,293,644 | 3/1994 | Barry et al. | 455/54.1 |
| 5,369,783 | 11/1994 | Childress et al. | 455/34.2 |

FOREIGN PATENT DOCUMENTS

| | | |
|---|---|---|
| 0570937 | 11/1993 | European Pat. Off. . |
| 8701537 | 3/1987 | WIPO . |

*Primary Examiner*—Chi H. Pham
*Attorney, Agent, or Firm*—Ware, Fressola, Van Der Sluys & Adolphson LLP

[57] ABSTRACT

A method is proposed in which groups are formed by first broadcasting a group definition message (GDM) in which a logical formula (LF) is included expressing conditions (C1-N) on classification parameters of terminals which may have to be included in such groups. Each of these terminals then checks for itself whether its classification parameters, such as individual and group addresses, satisfy this formula which consists in combining these conditions via logical operators (L1—(N-1)). If so, a dynamic group address (DGA) included in the group definition message is allocated to such a terminal such that it may subsequently be paged by using this dynamic group address. A specific use of this method in which these groups are used to efficiently arbitrate access of a shared transmission medium between the above terminals is also shown.

12 Claims, 1 Drawing Sheet

METHOD FOR FORMING GROUPS OF COMMUNICATION TERMINALS AND USE OF SAME

TECHNICAL FIELD

The present invention relates to a method for forming a group of communication terminals out of a plurality of communication terminals through allocating to each of said terminals of said group a dynamic group address associated with said group.

BACKGROUND OF THE INVENTION

Such methods are already well known in the art, for instance from the European Patent Application EP-A2-0570937. Therein, the groups are formed by first paging each terminal individually to inform it that it is included in a group with a particular dynamic group address and, after having so paged each of the group members, by then addressing the thus formed group by using this dynamic group address.

The use of groups is a well established practice in particular in mobile communication networks wherein they are for instance used as in the known method to establish a group call via the paging message. Such groups and group calls have however a very wide application area that is neither restricted to terminal paging in a strict sense nor to mobile communication networks nor even, for that matter, to networks that use a so called shared transmission medium in general.

Indeed, on the one hand and as explained in detail later on; the paging message might contain control information for assigning to such a group specific access channels so as to reduce the collision probability or for assigning to such a group specific paging channels on which the terminals of a group are to listen in. The latter feature is advantageous in that it allows decreasing the time needed to page a group of terminals as well as reducing the amount of energy required in each of the terminals to listen in on the paging channels. Also, in conventional wired networks such groups might prove to be useful, for instance in implementing Universal Personal Telecommunications or UPT as with groups it is not necessary to pinpoint the exact location of the terminals of the groups when information has to be conveyed thereto.

In view of the above it may be appreciated that the possibility of defining such groups dynamically—as opposed to pre-assigning them to the terminals or to users thereof on their subscription—is extremely advantageous as the use of a large number of pre-assigned addresses can thus be avoided. Furthermore, the definitions of the groups may be adapted to take account of the present state of the network in which the groups are defined as well as of user or terminal mobility.

However, a major drawback of the above known method for forming dynamic groups is that it entails a large amount of signalling traffic to form each group. This signalling traffic furthermore dramatically increases with the number of groups and the number of terminals included therein and thus puts an undue burden on the network in which these groups are formed, particularly but not exclusively when a transmission resource available therein is scarce, such as for instance in mobile communications systems.

DISCLOSURE OF INVENTION

An object of the present invention is therefore to provide a method for forming groups of terminals in which the required signalling traffic is smaller and which is thus more feasible to implement.

This object is achieved by virtue of the fact that said method includes the following steps:
broadcasting to said plurality of terminals a group definition message in which said dynamic group address is bound to one or more conditions regarding one or more classification parameters of said terminals;
checking in each of said terminals whether its said classification parameters satisfy said conditions; and,
allocating said dynamic group address to each of said terminals in which said conditions are thus satisfied.

The invention is based on the insight that in using such conditions regarding parameters having specific values in each communication terminal, this terminal may decide for itself whether it forms part of the group or not by filling in these values in these conditions. Hence it is no longer necessary to inform each terminal separately that it forms part of this particular group, it being sufficient to broadcast the group definition message and to include in each of the terminals checking means to verify whether or not it satisfies the conditions included in this message. A further advantage which is so obtained is that groups may be formed more rapidly as they can be used directly after broadcasting the group definition message instead of having to wait until all terminals of a group are paged separately.

An important feature of the invention is that said dynamic group address is bound to a logical formula included in said group definition message as a string of said one or more conditions and logical operators and in that each of said conditions are associated to an identifier indicating to which type of classification parameter it applies as well as which requirement a said classification parameter of said type is to meet.

In this way a very powerful and generic syntax for the group definition message is established. Indeed, a large number of conditions may be simultaneously used to define a group through the use of a logical formula while also each of these conditions may pertain to distinct requirements and even to distinct types of classification parameters, examples of which will be given below. It is therefore clear that with a group definition message of this type groups may be defined in a very flexible and efficient manner.

A characteristic feature of the present invention is that, for one of said conditions, said type is an address of a specific fixed length, said requirement being that at least one of said addresses of a said communication terminal equals a parameter included in said one condition.

This most simple condition allows the information of a group by making the union between terminals having addresses that are included in the group definition address or to make the intersection between already existing groups, the terminals of which all have a same group address.

A further characteristic feature of the invention is that, for one of said conditions, said type is an address of a specific fixed length, said requirement being that at least one of said addresses of a said communication terminal equals a first parameter in all symbol positions in which a second parameter has a predetermined value, both said first and second parameters being included in said one condition.

Such a masking condition clearly is a very powerful tool for defining rather large and complex groups in a simple way especially when combined with an address numbering scheme in which certain address bits have specific meanings. When, for example, specific ones of these bits relate to the origin or profession of a corresponding user it is straightforward to form a group of terminals which users have same profession and come from a same country by defining the above second or mask parameter to mask all address bits except these specific ones.

Still other features of the invention are that said address is either an individual address which is unique to one of said terminals or a group address common to a plurality of said terminals, each said individual or group address being a uniquely assigned word of said fixed length and that said dynamic group address is a said group address with said specific length.

By thus assigning individual and group addresses, it is first of all obtained that conditions need not specify beforehand to which type of address they relate. Indeed, since each address is a unique word no confusion can arise by each terminal checking such conditions by trying them out for each of its addresses. Moreover, by allowing group addresses to be formed not only for specific purposes, as is described hereinbelow, but also to constitute regular group addresses, a genuine dynamic numbering scheme may be implemented adding to the flexibility with which groups may be formed as well as making the basic numbering scheme more flexible and efficient with respect to known methods in which each basic address was to be pre-assigned.

Another important feature of the present invention is that, for one of said conditions, said type is a subscriber access class, said requirement being that a said subscriber access class of a said mobile terminal is equal to or is larger than a parameter included in said one condition.

Since such subscriber access classes normally pertain to a user hierarchy, e.g. in a mobile network for police services, conditions on these classes allow one to easily obtain groups of users of high rank only.

The latter feature is particularly advantageous if the method is used in the following way, which is that said method is used for paging said group of terminals and further includes the steps of broadcasting a paging message including said dynamic group address and of processing said paging message in each of said terminals to which said dynamic group address is allocated and in that said paging message is an access defining message defining access opportunities to a transmission medium shared between said terminals for said group and in that said access opportunities are access codes and that a second said paging message is broadcast to said terminals, said second paging message being an access assigning message for assigning channels of said shared transmission medium to said access codes, said terminals of said group being allowed to attempt access on said thus assigned channels.

The use of groups to restrict access opportunities is, as already mentioned above, useful to restrict collision between access-desiring terminals. Previously, the definition of groups for this purpose was restricted to the allocation of the above pre-assigned subscriber access classes whereas the latter now only constitutes a refinement of basic tools for forming dynamic groups.

It is to be noted that other uses may be devised in which a paging message for a group of terminals is needed and that examples thereof may be found by a person skilled in the art whereever paging operations relating to a terminal group are required in conventional communication networks.

A final important feature of the present invention is that, for one of said conditions, said type is a message priority, said requirement being that a said message priority is larger than or equal to a parameter included in said one condition, and in that said dynamic group address is allocated to said communication terminal while indicating a lowest message priority for which it is valid if said formula is satisfied for at least one of said message priorities, and in that said terminal is only allowed said access opportunities for messages of a said message priority larger than or equal to said thus indicated lowest message priority.

In this way, it is further also allowed to combine message priorities with other types of parameters within the same group definition message. Indeed, by storing the dynamic group addresses in the above way, i.e. by appending thereto the lowest message priority, the terminal may check for each message if it is allowed to use the access opportunities that are linked to this dynamic address. In this way, it is avoided that separate messaging is required to take the message priorities into proper account.

The above mentioned and other objects and features of the invention will become more apparent and the invention itself will be best understood by referring to the following description of an embodiment taken in conjunction with the accompanying drawings wherein:

BEST MODE FOR CARRYING OUT THE INVENTION

Figure 1:
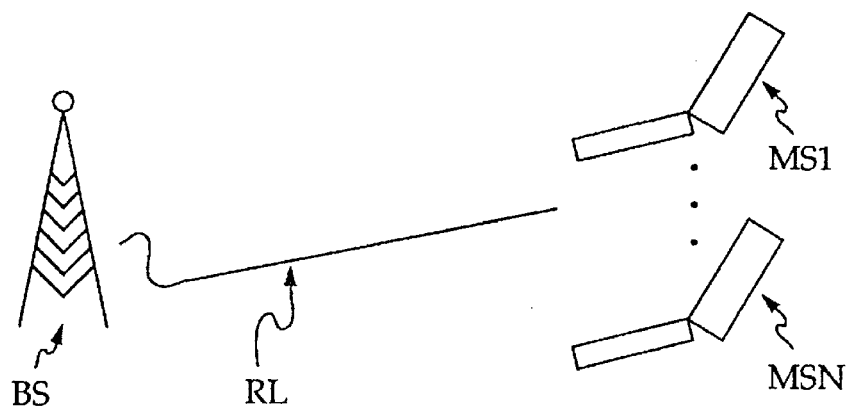
FIG. 1 depicts a mobile communications network in which the present invention can, for example, be used as described in connection with FIGS. 2, 3a and 3b.
Figure 2:
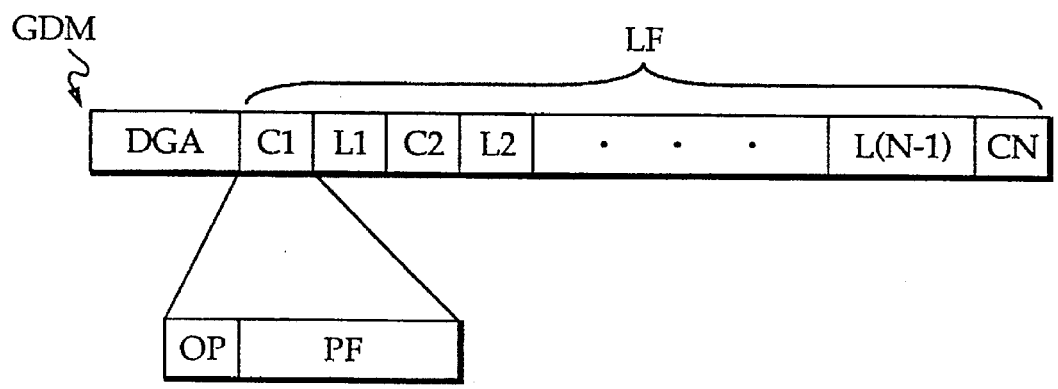
FIG. 2 depicts a group definition message GDM used in accordance with the present invention to group the mobile terminals MS1, . . . MSN of the above network; and, FIGS. 3a and 3b depict an access definition message ADM and an access assignment message AAM used in the network of FIG. 1 to arbitrate the access of the mobile stations MS1, . . . MSN.

The mobile communication network shown in FIG. 1 can, e.g. a Trans-European Trunked RAdio or TETRA network operating in accordance with the TETRA standard currently being drafted by the European Telecommunications Standards Institute or ETSI. The shown network includes a base station BS and a plurality of mobile stations MS1, . . . MSN between which information is transferred over a standard radio link RL split in a number of channels each consisting of periodically reoccurring TDMA time slots. Such a network is already well known in the art and therefore reference is made herein to aspects of thereof without describing it in detail. It is also to be noted that when referring to specific properties of such a network, such references need to be considered in the light of the present state of the standardization processes as subsequent changes to this state can be all but excluded.

A first step of the present method may consist in the sending of a group definition message GDM on one of the above channels, namely a channel with the property that each of the mobile stations MS1, . . . MSN listen in on this channel and so receive and process the group definition message GDM that is sent thereon. Before being able to describe the way in which the mobile stations MS1, . . . MS2 process GDM, its syntax will first be described hereafter.

GDM may consist of a dynamic group address DGA as well as of a logical formula LF which is subdivided in a series of conditions C1 to CN and logical operators L1 to L(N-1), each of the conditions C1 to CN being further split in a condition operator OP and a parameter field PF. While DGA may for example be a 10-bit word enabling BS to form 1024 distinct dynamic groups and the logical as well as the condition operators (OP) also have a fixed length, e.g., of 1 and 2 bits, respectively, the parameter fields PF may have a variable length depending on the condition operator OP that preceeds them.

The four different values for the condition operators OP have the following meanings which, it should be understood are exemplary only. A first such value indicates that one of the 24-bit Short Subscriber Identities or SSIs of a mobile terminal MS1, . . . MSN should equal the 24-bit parameter which follows this OP value. A second such value indicates that one of the SSIs should equal a 24-bit parameter that immediately follows this OP value in all bit positions in which a second such 24-bit parameter following the previous parameter within a same parameter field PF has a binary value of 1. It may be appreciated that in this way an address masking condition is formed with a 48-bit parameter field PF the 24 first bits of which represent a target SSI and the 24 last bits of which form a mask SSI. A third value indicates that a subscriber access class of a mobile station MS1, . . . MSN should be equal to or larger than a 4-bit parameter following this OP value. A fourth such value indicates that a message priority should be equal to or larger than a 2-bit parameter following the latter OP value.

Continuing with this example, the two possible values for the logical operators L1, . . . L(N-1) respectively indicate that a following part of the expression contained in the GDM should be OR'ed or AND'ed with a preceeding part thereof, the rules of precedence being described in more detail lateron.

It is to be noted that throughout the above, TETRA-terminology is used which is known from the current stage of the above mentioned standardization process and which is thus only briefly described in the following. The SSIs include at least one Individual SSI or ISSI which is unique to any one mobile station as well as at least one Group SSI or GSSI, the latter GSSI being common to a number of mobile stations which together form a group and being pre-assigned to these mobile stations. With respect to these SSIs it is important to note that each of them is unique within the system such that for the evaluation of the conditions C1 to CN, the mobile station need not know whether it relates to a GSSI or an ISSI and may arrive at the correct result by checking such conditions C1 to CN for each one of its SSIs and by concluding that it has been satisfied if it is satisfied for at least one of them regardless of this being an ISSI or a GSSI.

To each of the mobile stations MS1, . . . MSN, one of the 4-bit subscriber access classes are pre-assigned in order to confer superior access rights to mobile stations having an higher access class. For instance, emergency services may in this way be allowed better access rights than other users, or subscriber access classes may relate to a subscriber hierarchy. Similarly, for each message a 2-bit priority is considered in order to give the subscriber the opportunity to access the system in high load situations by sending a more costly high priority message.

According further to the above example, prior to evaluating the GDM the mobile station MS1, . . . MSN temporarily stores it so as to be be able to evaluate it at its own pace. This evaluation is now described. First, it entails a mobile station retrieving bits 11 and 12 of the GDM. According to the value of the thus retrieved operator OP of the first condition C1, the mobile station performs one of the operations which are defined above when discussing the different values of OP. Through this value the mobile station may also calculate the position within GDM of a next logical operator L1 since the value of OP also indicates the length of the corresponding parameter field PF of the condition C1 and it retrieves this value after having checked whether the condition C1 is satisfied by it. After having thus retrieved L1, the mobile station may proceed in a totally similar way with the evaluation of the further conditions C2 to CN and the retrieving of the further logical operators L1 to L(N-1) until the last operator CN is reached.

While in a TETRA-network the length of the message GDM is explicitly indicated in a control header (not shown) of this and other messages sent over the mentioned channel so that the finding of the last condition CN is trivial, it is worthwile to comment also on the cases in which such a explicit length indicator is absent.

In the latter case and when the GDM further also is of a fixed length, GDM does not have to be entirely filled with conditions C1 to CN and operators L1 to L(N-1) such that the mobile station needs some rule of deciding when it has evaluated the last condition CN. There are in fact a number of ways in which the mobile station may so detect the end of the expression contained in GDM. A first such way is that it stumbles either onto a "logical operator" occupying the last position of GDM in which case the mobile station knows that this last bit should be discarded. Another way is that it finds a "condition" for which there is not enough place in the GDM e.g. because there remains only 1 bit after the previous "logical operator" or because there remain less bits than required by the parameter field PF of such a condition. In this case, the mobile station discards all bits from the last "logical operator" onwards. It is clear that in these latter two cases GDM has to be a fixed length message.

A third way is that the mobile station finds an OP with the above fourth value in which case the mobile station may decide that this is the last condition CN. In this way, it is clear that the base station BS always needs to include such a condition on a message priority as the last condition CN in the logical formula LF. This is no restriction since, if no such condition is necessary for a particular group, it can include the trivial condition that the message priority is to be larger than or equal to the lowest message priority possible.

It is to be noted that the latter way of indicating the last condition CN may be also used in GDMs of a variable length provided only that the base station BS determines the GDM in the way corresponding to the latter rule. For variable length messages it is then also clear that the condition on message priority is always best put at the end of the logical formula LF since then no overhead bits are needed to express the end of this formula in case such a non-trivial condition on message priority needs to be expressed therein.

With respect to the above, it is presently best noted that for reasons given below the base station BS needs to configure the GDM such that first all the conditions on SSIs are listed therein and that thereafter the conditions on the subscriber access class and the message priority respectively are included in the GDM when one or both of these latter conditions are needed either to express a restriction or to put an end to the formula LF.

The mobile station may thus clearly check whether or not it satisfies the expression included in GDM by, from the beginning onwards, combining results of the application of the conditions C1 to CN through the interspacing logical operators L1 to L(N-1). In so combining these results, it is clear that no parentheses are used and hence also that this should be taken into account by the base station BS when forming GDM. It is to be noted that the above combination rule does not apply to the last two conditions when they relate to subscriber access class and message priority respectively. If such is the case, the results of these latter conditions are first combined through the logical operator L(N-1) and the so obtained result is only then combined with the remainder of the logical formula LF. The latter clearly corresponds to the implicit introduction of parenthesis for the latter specific conditions when they are simultaneously present in GDM.

Finally, and if the expression is thus found to be valid for the mobile station the dynamic group address DGA is added to a list of such DGAs contained in the mobile station. It is to be noted that in adding this DGA the lowest message priority for which it is valid is appended thereto. When this DGA is found to be valid regardless of message priority, i.e. when the logical formula LF is satisfied regardless of this message priority, the above mentioned lowest possible value of the message priority is appended to such a DGA.

It is to be noted that thus formed dynamic groups with a specific DGA may be released by broadcasting a new GDM relative to a group with this DGA in which case the terminals may again verify the corresponding logical formula LF and delete the DGA from its DGA list in case it does not satisfy this new formula LF.

Figure 3A:
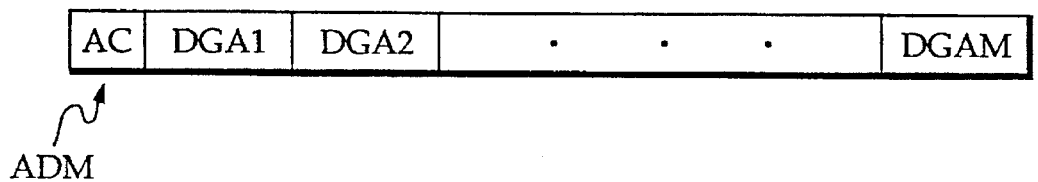
Figure 3B:
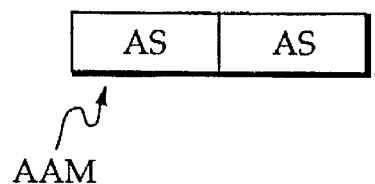

With the above description in mind, an application example of such groups may be given with reference to FIGS. 3a and 3b.

The exemplary access definition message ADM shown in FIG. 3a includes a 2-bit access code AC as well as a plurality of 10-bit dynamic group addresses DGA1, ... DGAM and is sent over the same channel as was GDM in order for it to be received as well as processed by all of the terminals MS1, ... MSN. Each of these terminals checks whether one of the dynamic group addresses DGA1, ... DGAM is included in its above mentioned DGA list and if so it adds the 2-bit access code to an access code list. It is to be noted in this regard that in adding this access code AC to this list, the lowest message priority for which it is valid is appended thereto. This lowest message priority corresponds to the lowest 2-bit value appended to any of the DGAs simultaneously included in the above DGA list and the ADM.

It is to be finally noted with respect to this ADM that the binding of such an access code AC to DGAs may be obtained in a similar way as the binding of a DGA to particular terminals but in this case requiring less complex rules which only have to operate on these DGAs. The exact syntax of the ADM is therefore not described in detail since it may well be derived from the above by a person of ordinary skill in the art.

The exemplary access assignment message AAM shown in FIG. 3b consists of two 3-bit values AS and is sent via the downlink broadcast control channel associated to each two uplink traffic channels displaced over 2 time slots with respect to this downlink channel. Each of the mobile terminals, upon receipt of AAM, check the first bit of the above two 3-bit values. If this bit is 1, this means that the associated uplink traffic channel is already in use. Otherwise the 2 final bits of the 3-bit values AS include an access code AC.

The mobile terminal then checks whether the latter access code AC is contained in its access code list. If this is not the case, this terminal is not allowed to attempt the access of the associated traffic channel. If this access code AC is however contained in this list, the mobile terminal may attempt access of the associated traffic channel according to a well known ALOHA-access protocol. It is to be noted in this respect that the mobile terminal first has to check which 2-bit value is appended to AC such that it only attempts access for messages with sufficiently high message priority.

It is to be noted that this indirect way of linking the dynamic group addresses DGA1, ... DGAM to specific uplink traffic channels in which associated terminals are allowed to access the shared medium is a typical TETRA-property and that it could well be that in other systems the linking is done in a direct way, i.e. without the intermediary of the access codes AC.

Importantly, the above described way of forming dynamic groups can be also used for purposes other than access arbitration. While such other uses for these dynamic groups may be devised by the skilled person without exerting inventive skill, a few simple examples will be explained briefly hereafter without going into detail as actual implementation of these examples can be straightforwardly derived from the above detailed description.

Firstly, the above mentioned GSSIs may be dynamiccally allocated instead of pre-assigning them by using a GDM of the above type but in which a 24-bit DGA is included. In this case not all of the above described types of conditions are useful since for instance allocating GSSIs dependent upon message priority or subscriber access class is unnecessary. Therefore a GDM used for the present purpose only includes operations on addresses. However, such operations may now also relate to dynamically allocated groups via the corresponding GSSIs which constitutes a further flexibility which may e.g. be used to progressively include terminals migrating into a specific network in a same group which was already dynamically allocated. A further example of the use of this so called dynamic group number assignment procedure is to include one group of terminals in an already existing one and for example then also release the GSSI relating to the former group.

A second and final example of other application are of the above dynamic groups is found in our co-pending not yet published European Patent Application EP-93202709.7. Therein, paging channels are assigned to groups of terminals such that the delay with which all terminals of this group may be paged may be diminished while the amount of energy used by the terminals to listen in on paging calls is kept small. Indeed, since each terminal of the group listens in on the same paging channels, they may be paged in a single attempt while the number of assigned paging channels is small compared to the total set of possible such paging channels. It is then clear that such dynamic groups may be advantageously used to assign the paging channels to a group of terminals with one dedicated and broadcasted paging message while afterwards these groups may be used as address in the actual paging of these terminals, for instance to set up a downlink group call, within the assigned paging channels.

While the principles of the invention have been described above in connection with specific apparatus, it is to be clearly understood that this description is made only by way of example and not as a limitation on the scope of the invention.

I claim:

1. Method for forming a group of communication terminals out of a plurality of communication terminals (MS1-N) through allocating to each of said terminals of said group a dynamic group address (DGA) associated with said group, comprising the steps of:

broadcasting to said plurality of terminals (MS1-N) a group definition message (GDM) in which said dynamic group address (DGA) is derivable from one or more conditions (C1-N) regarding one or more classification parameters of said terminals;

checking in each of said terminals (MS1-N) whether its said classification parameters satisfy said conditions; and, allocating in each terminal of said terminals in which said conditions are thus satisfied said dynamic group address to said terminal.

2. Method according to claim 1, wherein said dynamic group address (DGA) is bound to a logical formula (LF) included in said group definition message (GDM) as a string of said one or more conditions (C1-N) and logical operators (Li—(N-1)) and wherein each of said conditions are associated to an identifier (OP) indicating to which type of classification parameter it applies as well as which requirement a said classification parameter of said type is to meet.

3. Method according to claim 2, wherein, for one of said conditions, said type is an address of a specific fixed length, said requirement being that at least one of said addresses of a said communication terminal equals a parameter included in said one condition.

4. Method according to claim 3, wherein, for one of said conditions, said type is an address of a specific fixed length, said requirement being that at least one of said addresses of a said communication terminal equals a first parameter in all symbol positions in which a second parameter has a predetermined value, both said first and second parameters being included in said one condition.

5. Method according to claim 3, wherein said address is either an individual address which is unique to one of said terminals or a group address common to a plurality of said terminals, each said individual or group address being a uniquely assigned word of said fixed length.

6. Method according to claim 5, wherein said dynamic group address is a said group address with said specific length.

7. Method according to claim 3, wherein, for one of said conditions, said type is a subscriber access class, said requirement being that a said subscriber access class of a said mobile terminal is equal to or larger than a parameter included in said one condition.

8. Method according to claim 1 for paging said group of communication terminals, wherein it includes the further steps of broadcasting a paging message including said dynamic group address (DGA) and of processing said paging message in each of said terminals to which said dynamic group address is allocated.

9. Method according to claim 8, wherein said paging message is an access defining message for defining access opportunities to a transmission medium shared between said terminals for said group.

10. Method according to claim 9, wherein said access opportunities are access codes and wherein a second paging message is broadcast to said terminals, said second paging message being an access assigning message for assigning channels of said shared transmission medium to said access codes, said terminals of said group being allowed to attempt access on said thus assigned channels.

11. Method according to claim 9 wherein, for one of said conditions (C1-N), said type is a message priority, said requirement being that a said message priority is larger than or equal to a parameter included in said one condition, and wherein said dynamic group address (DGA) is allocated to said communication terminal while indicating a lowest message priority for which it is valid where said formula is satisfied for at least one of said message priorities, and wherein said terminal is only allowed to use said access opportunities for messages of a message priority larger than or equal to said thus indicated lowest message priority.

12. Method according to claim 4, wherein said address is either an individual address which is unique to one of said terminals or a group address common to a plurality of said terminals, each said individual or group address being a uniquely assigned word of said fixed length.

* * * * *